United States Patent [19]
Jenkins

[11] 4,036,053
[45] July 19, 1977

[54] METHODS OF AND MEANS FOR MEASURING LIQUID FLOW

[76] Inventor: Roy Jenkins, 86, All Saints Road, Cheltenham, England

[21] Appl. No.: 661,993

[22] Filed: Feb. 27, 1976

[30] Foreign Application Priority Data

Feb. 28, 1975 United Kingdom ............... 8378/75

[51] Int. Cl.$^2$ .................... G01F 1/68; G01F 23/00
[52] U.S. Cl. ................................... 73/204; 73/215; 73/295
[58] Field of Search ............... 73/204, 215, 216, 295; 340/244 R

[56] References Cited

U.S. PATENT DOCUMENTS

| | | | |
|---|---|---|---|
| 1,992,780 | 2/1935 | Skeats | 73/215 |
| 2,211,606 | 8/1940 | Pratt | 73/295 |
| 2,702,476 | 2/1955 | De Boisblanc | 73/295 |
| 3,308,665 | 3/1967 | Williams et al. | 73/295 |
| 3,729,994 | 5/1973 | Klug | 73/215 |

Primary Examiner—Herbert Goldstein
Attorney, Agent, or Firm—Young & Thompson

[57] ABSTRACT

The flow of liquid along a conduit or over a weir is measured by means of temperature-sensitive components positioned in vertically spaced relationship so that the number of components in contact with the liquid depends on the depth thereof. Thermal energy is supplied to the components in such manner that the components out of contact with the liquid are subjected to a substantial temperature increase. The components are periodically heated and examined after each period. Those of one temperature state are counted to indicate the depth of liquid and hence the flow rate.

A count linearly related to the flow in a given conduit or weir can be achieved.

6 Claims, 1 Drawing Figure

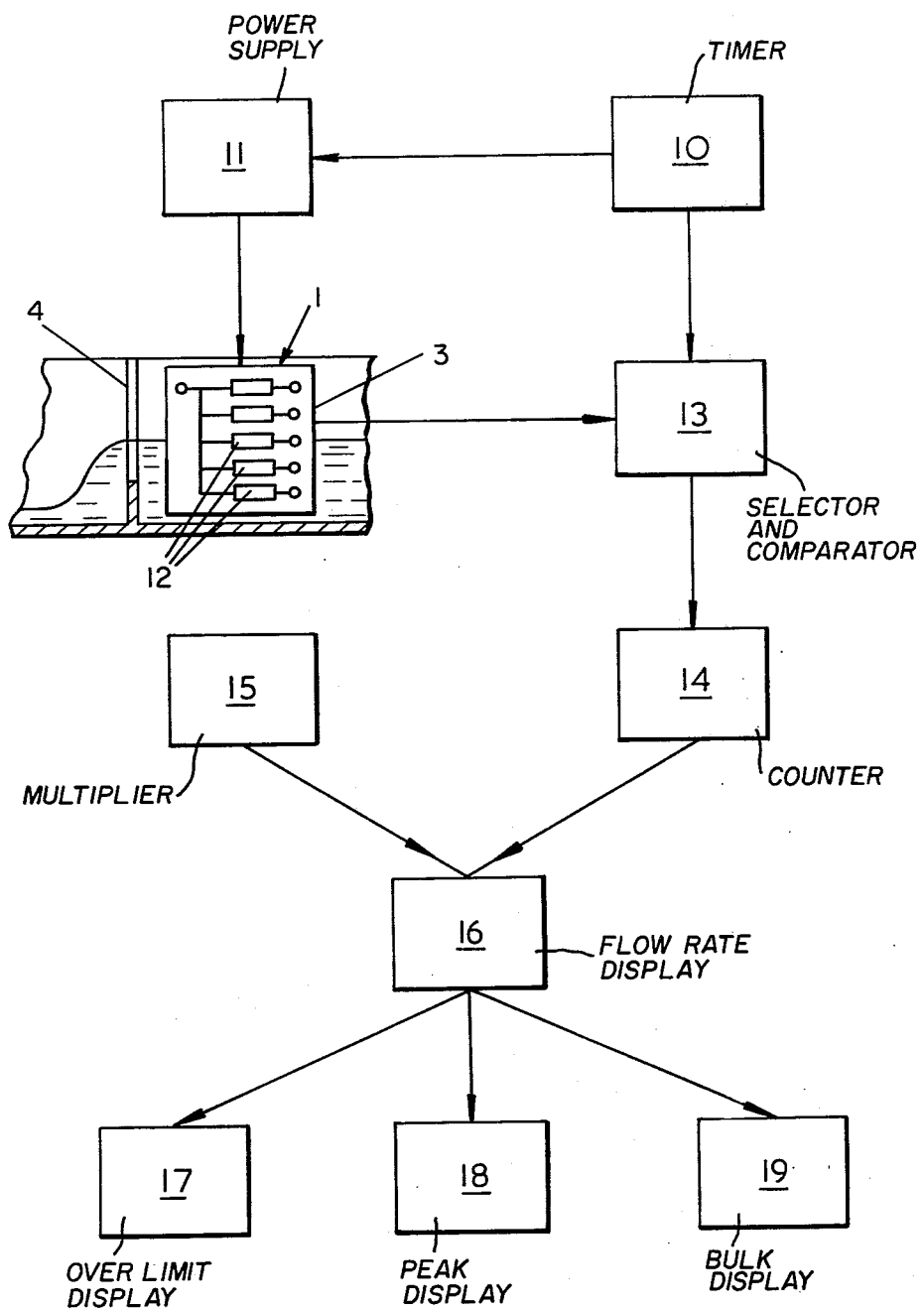

4,036,053

METHODS OF AND MEANS FOR MEASURING LIQUID FLOW

FIELD OF THE INVENTION

This invention relates to methods of and means for measuring liquid flow.

SUMMARY OF THE INVENTION

According to a first aspect of the invention there is provided a method of measuring the flow of liquid along a conduit or over a weir which comprises providing a plurality of temperature-sensitive circuit components and disposing said components at vertically spaced positions within the conduit so that the number of components in contact with the liquid is dependent on the depth of liquid in the conduit or passing over the weir, supplying electrical energy to said components so as to increase the temperature thereof in a manner which is dependent on whether or not a particular component is in contact with the liquid, and providing a detecting circuit responsive to the temperature-sensitive property of the components to identify which of the components are in contact with the liquid.

According to a second aspect of the invention there is provided means for measuring the flow of liquid along a conduit or over a weir which comprises a plurality of temperature-sensitive circuit components, support means for supporting said components at a plurality of vertically spaced positions so that, when the support means is disposed within the conduit or adjacent the weir, the number of components in contact with the liquid is dependent on the depth of liquid in the conduit or passing over the weir, supply means for supplying electrical energy to said components so as to increase the temperature thereof in a matter which is dependent on whether or not a particular component is in contact with the liquid, and a detecting circuit responsive to the temperature-sensitive property of the components to identify which of the components are in contact with the liquid.

The circuit components are preferably so mounted on the support means that there is a direct relationship between the number of components in contact with the liquid and the rate of flow of liquid along the conduit or over the weir.

Thermistors may be used as the temperature-sensitive circuit components with the arrangement such that the thermistors are connected simultaneously, individually or in batches to an electrical power supply for either a predetermined or variable period such that the temperatures of those thermistors in contact with the liquid are only negligibly affected whereas the temperatures of those transistors out of contact with the liquid are increased substantially. Thus, for those thermistors in contact with the liquid there is no substantial change in resistance whereas the resistance of each thermistor clear of the liquid is changed substantially.

After the thermistors have been connected to the electrical power supply for said predetermined period, the thermistors are preferably connected to a logic circuit such as a sequencing device whereby the resistances of the thermistors are compared with a standard resistance or comparison resistances or with the resistances of adjacent unheated thermistors and a count is obtained of either the number of thermistors whose resistances have changed significantly or the number whose resistances are substantially unchanged.

BRIEF DESCRIPTION OF THE DRAWING

The single FIGURE of the accompanying drawing illustrates the flowmeter in block form.

DESCRIPTION OF THE PREFERRED EMBODIMENTS

The flowmeter comprises an immersible sensing element 1 connected in a measuring circuit and having an array of spaced thermistors 12 mounted on a support element 3 standing vertically in use upstream of a weir 4.

The circuit includes a timer 10 controlling operation of a power supply 11 from which either currents of the order of amps or milliamps are supplied to the array of thermistors 12, the support element being such as to support the thermistors in a column or a vertical row. For use in a conduit of curvilinear cross section, the support element may take the alternative form of a resilient plastics strip bent in corresponding manner so as to conform to the curvature of the conduit, the support element being held resiliently in position and the thermistors being disposed around the circumference of the conduit in predetermined array as explained below.

The array of thermistors 12 is connected to a circuit selector and resistance comparator 13, the arrangement being such that each thermistor is measured individually to provide either a 0 or a 1.

The selector and comparator 13 is conveniently a shift registor such as Fairchild 9300 SR, the thermistors being connected as parallel inputs. The clock timer 10 applies pulses to the shift register to produce a serial output comprising a bit sequence in which either the number of 0's or the number of 1's is a count of the number of thermistors immersed. This is to say, there is a 0 or 1 output in dependence on whether the resistance of the associated thermistor is substantially the same as or is substantially different from the resistance of a comparison resistor. In use, the thermistors are heated by periodic application thereto of a predetermined voltage under the control of the timer 10 for a period of say 15 seconds and then, immediately thereafter, the various thermistors are connected to a resistance measuring circuit and either 0 or 1 outputs are obtained on the shift register 13 in dependence on whether the thermistors are above or below the level of liquid in the conduit. The shift register 13 is connected to an initial or primary counter 14 which counts the number of 1 outputs from the shift register 13, i.e. it counts the number of thermistors immersed in the liquid.

The thermistors are so mounted upon the support means that the contents of the primary counter 14 are directly proportional to the rate of flow. However, the flow figure to be indicated will depend upon the size of the conduit or weir and upon the units in which it is desired to express the rate of flow. For any given set of circumstances, all the relevant factors can be allowed for by multiplying or dividing the contents of primary counter 14 by a constant. A multiplier 15 is provided for adjustably presetting this constant and operates in conjunction with the primary counter 14 to supply a flow rate display counter or register 16 with a figure corresponding to the rate of flow expressed in the desired units of measurement.

In order to provide complete information concerning the rate of flow of liquid along the conduit, further components are connected to the flow rate display counter 16. These further components comprise an overlimit display counter 17, a maximum rate register and indicator 18 for peak display and a total volume register and indicator 19 for bulk display. It is normal practice to require that the rate of flow of liquid through a conduit should only very occasionally exceed a predetermined value and a signal is accordingly transmitted to the over-limit counter 17 each time that this value is exceeded so as to obtain a record of the number of times that over-limit conditions occur.

In order to operate ancillary equipment such as automatic samplers, alarm systems and the like, appropriate signals are provided from the timer 10, the flow rate counter or register 16, the maximum rate register and indicator 18 and the total volume register and indicator 19. The maximum rate register and indicator 18 is continually up-dated each time that the reading of the flow counter 16 exceeds all previous readings, a re-setting facility being provided to enable the indicator to be reset at will, for example, either daily or weekly. Readings of the rate of flow can be taken, for example, at five-minute intervals, with the counter or register 16 indicating units of volume per hour and, in such case, the reading displayed by the counter 16 is divided by twelve and the resulting value is added to the then existing value of the total volume register and indicator 19. The figure displayed by the total volume register and indicator 19 thus represents the total volume of liquid that has flowed along the conduit during a particular time period.

Graphs, formulae and tables are available, for example, in British Standard Specification No. 3680, from which the depths corresponding to equal increments of flow may be calculated or determined graphically for any given shape, size and slope of pipe or conduit and for any given shape and size of weir, flume or channel. The thermistors are accordingly mounted on the plastics strip with the spacings between the thermistors corresponding to equal increments of rates of flow.

In the particular arrangement described above, thermistors are used as the temperature-sensitive elements. Other circuit components such as temperature-dependent semi-conductors may, however, be used and, in particular, thermally-operated relays may be employed. In such case, the contacts controlled by the relays may perform the function of the shift register referred to above and the contacts may be arranged to provide a direct indication of the number of thermally-operated relays which are in contact with the liquid. Because the physical dimensions of a thermally-operated relay are normally considerably greater than those of a thermistor, the relays will normally only be used for measuring flow along a conduit of considerable dimensions such as a river or stream. The measuring means may also find application for use as a rain gauge or meter e.g. the downpipe from an office or factory roof is connected to a channel containing the flowmeter.

There are various locations at which it is important that control of effluent and other flows should be provided. For example, the yard of a factory may be coated with a fine layer of a powder which must not be allowed to enter the surface water drainage system until predetermined dilution thereof has been effected. Thus, at the commencement of a downpour, an extremely high concentration of the powder will be present in the water passing into the drains and the flow measuring means may be set to provide a signal whereby the water passing into the drains is initially directed to a storage tank. However, when a predetermined volume of water has fallen, the concentration of the powder will have fallen and the water passing into the factory drains may then be allowed to pass directly into the main sewer. Moreover, if the rain continues for a sufficient length of time, controlled discharge from the storage tank may be permitted. The measuring means of the present invention can thus be seen to have widespread application.

What I claim is:

1. A flowmeter comprising an immersible sensing element and measuring means connected thereto, said sensing element having a plurality of temperature-sensitive circuit components in spaced array for disposition in a conduit or weir so as to be immersed and cooled to an extent dependent on the depth of liquid in the conduit or weir, said measuring means including:
    a. a timer which completes a heating circuit for the temperature-sensitive elements for a selected period at selected intervals,
    b. a comparator connected to the temperature-sensitive components for differentiating between the components of one temperature state and the components of another temperature state,
    c. a counter responsive to the comparator for recording the number of components of one of said temperature states to indicate the depth of immersion of the sensing element and hence the flow rate.

2. A flowmeter according to claim 1, wherein the temperature-sensitive circuit components in spaced array are spaced apart for linear relation between the number of said components which are immersed in a given conduit or weir and the flow rate in that conduit or weir.

3. A flowmeter according to claim 1, wherein the temperature-sensitive circuit components in spaced array are thermistors and the comparator is a resistance comparitor.

4. A flowmeter according to claim 1, including an adjustable multiplier coupled to said counter to provide for different ranges of flow rate.

5. A flowmeter according to claim 1, including a bulk or total volume indicator displaying a timed count from said counter.

6. A flowmeter according to claim 1, including a peak-indicator and an over-limit indicator coupled to said counter.

* * * * *

UNITED STATES PATENT AND TRADEMARK OFFICE
CERTIFICATE OF CORRECTION

PATENT NO. : 4,036,053
DATED : July 19, 1977
INVENTOR(S) : Roy JENKINS

It is certified that error appears in the above-identified patent and that said Letters Patent are hereby corrected as shown below:

Column 1, line 54, change "transistors" to

--thermistors--.

Signed and Sealed this

Thirteenth Day of February 1979

[SEAL]

Attest:

RUTH C. MASON
Attesting Officer

DONALD W. BANNER
Commissioner of Patents and Trademarks